US010257144B2

(12) United States Patent
Amemiya et al.

(10) Patent No.: US 10,257,144 B2
(45) Date of Patent: *Apr. 9, 2019

(54) SUPPORTING MESSAGE SHARING

(71) Applicant: International Business Machines Corporation, Armonk, NY (US)

(72) Inventors: Kenichi Amemiya, Yamanashi (JP); Hiroyuki Murayama, Tokyo (JP); Kotaro Sano, Chiba (JP); Noboru Umenai, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/791,520

(22) Filed: Oct. 24, 2017

(65) Prior Publication Data
US 2018/0048605 A1    Feb. 15, 2018

Related U.S. Application Data

(63) Continuation of application No. 14/838,487, filed on Aug. 28, 2015, now Pat. No. 9,319,625.

(30) Foreign Application Priority Data

Oct. 15, 2014 (JP) ................................ 2014-210613

(51) Int. Cl.
*H04L 12/58* (2006.01)
*H04L 29/08* (2006.01)

(52) U.S. Cl.
CPC .............. *H04L 51/16* (2013.01); *H04L 51/22* (2013.01); *H04L 67/1095* (2013.01)

(58) Field of Classification Search
CPC ...... H04L 51/16; H04L 67/1095; H04L 51/22
See application file for complete search history.

(56) References Cited

U.S. PATENT DOCUMENTS 8,788,602 B1    7/2014 Wan
8,930,827 B1    1/2015 Dumans
(Continued)

FOREIGN PATENT DOCUMENTS

JP      H1166158      3/1999
JP      92002091871   3/2002
(Continued)

OTHER PUBLICATIONS

JPO Office Action: dated Apr. 12, 2016, 2 pages.
(Continued)

*Primary Examiner* — Oanh Duong
(74) *Attorney, Agent, or Firm* — Schmeiser, Olsen & Watts, LLP; Mark Vallone

(57) ABSTRACT

A method and system for processing an email. A mail hub device receives the email from a first mail server, a Mail Thread ID (MTID) from a Mail Thread Board (MTB) server, and additional data from the MTB server. The mail hub device transmits, to a second mail client, the email with the added MTID and the added additional data and in response, receives, from the second email client, a selection of a message from messages contained in the additional data. The mail hub device transmits, to the MTB server, a request to generate an update of the additional data based on the selection of the message. The mail hub device receives, from the MTB server, the updated additional data based on the selection of the message. The mail hub device transmits, to the first mail server, the updated additional data based on the selection of the message.

20 Claims, 10 Drawing Sheets

(56) References Cited

U.S. PATENT DOCUMENTS

| | | | |
|---|---|---|---|
| 9,819,625 B2* | 11/2017 | Amemiya | H04L 51/16 |
| 2001/0042098 A1 | 11/2001 | Gupta et al. | |
| 2003/0185379 A1 | 10/2003 | O'Connor et al. | |
| 2004/0049546 A1 | 3/2004 | Yoshida | |
| 2005/0177621 A1 | 8/2005 | Moody et al. | |
| 2007/0287483 A1 | 12/2007 | Park et al. | |
| 2008/0098070 A1 | 4/2008 | Heidloff et al. | |
| 2010/0056187 A1 | 3/2010 | Abuelsaad et al. | |
| 2010/0169447 A1 | 7/2010 | Mermod et al. | |
| 2010/0281122 A1 | 11/2010 | Li et al. | |
| 2011/0191433 A1 | 8/2011 | Du | |
| 2012/0088527 A1 | 4/2012 | Roka | |
| 2013/0124548 A1 | 5/2013 | Chhaparia et al. | |
| 2015/0019652 A1 | 1/2015 | Ordogh | |
| 2015/0113076 A1 | 4/2015 | Dubie et al. | |
| 2016/0112361 A1 | 4/2016 | Amemiya et al. | |

FOREIGN PATENT DOCUMENTS

| | | |
|---|---|---|
| JP | 2002183047 | 6/2002 |
| JP | 2002183058 | 6/2002 |
| JP | 2003099360 | 4/2003 |
| JP | 2003122676 | 4/2003 |
| JP | 2003150504 | 5/2003 |
| JP | 2003316692 | 11/2003 |
| JP | 2004127103 | 4/2004 |
| JP | 2004362477 | 12/2004 |
| JP | 2005084844 | 3/2005 |
| JP | 2008140125 | 6/2008 |

OTHER PUBLICATIONS

JP Office Action—Material for IDS dated Dec. 28, 2016, 1 page.
Notice of Allowance (dated Jun. 30, 2017) for U.S. Appl. No. 14/838,487, filed Aug. 28, 2015.

* cited by examiner

FIG. 6

```
To: id1@xxx
Cc: id2@xxx, id3@xxx
From: id0@xxx
Subject: Completion of Submission of Quotation to Company AAA
```
~71

```
Dear id1

I submitted a quotation to Company AAA yesterday.
I'll let you know when I receive a response from the client this weekend.
```
~72

FIG. 7

MTID: ABCD  ~70

```
To: id1@xxx
Cc: id2@xxx, id3@xxx
From: id0@xxx
Subject: Completion of Submission of Quotation to Company AAA
```
~71

```
Dear id1

I submitted a quotation to Company AAA yesterday.
I'll let you know when I receive a response from the client this weekend.
```
~72

| | | | | |
|---|---|---|---|---|
| id1@xxx | ☐ Noted | ☐ Thanks | ☐ No CC needed | ☐ Free comment |
| id2@xxx | ☐ Noted | ☐ Thanks | ☐ No CC needed | ☐ Free comment |
| id3@xxx | ☐ Noted | ☐ Thanks | ☐ No CC needed | ☐ Free comment |

```
MTID: ABCD                                                    ~70

To: id1@xxx
Cc: id2@xxx, id3@xxx
From: id0@xxx                                                 ~71
Subject: Completion of Submission of Quotation to Company AAA Dear id1

I submitted a quotation to Company AAA yesterday.            ~72
I'll let you know when I receive a response from the client this weekend.

id1@xxx   ☐Noted   ■Thanks   ☐No CC needed   ☐Free comment
id2@xxx   ☐Noted   ☐Thanks   ☐No CC needed   ☐Free comment   ~73
id3@xxx   ☐Noted   ☐Thanks   ☐No CC needed   ☐Free comment
```

FIG. 9

```
MTID: ABCD                                                              ~70

To: id1@xxx
Cc: id2@xxx, id3@xxx                                                    ~71
From: id0@xxx
Subject: Completion of Submission of Quotation to Company AAA Dear id1

I submitted a quotation to Company AAA yesterday.                       ~72
I'll let you know when I receive a response from the client this weekend.

id1@xxx   ☐ Noted   ■ Thanks   ☐ No CC needed   ☐ Free comment
id2@xxx   ▨ Noted   ☐ Thanks   ☐ No CC needed   ▨ Let me know as soon as
                                                    a re-quotation is needed
id3@xxx   ☐ Noted   ☐ Thanks   ☐ No CC needed   ☐ Free comment          ~73
```

FIG. 10

```
MTID: ABCD                                                    ~70

To: id1@xxx
Cc: id2@xxx, id3@xxx
From: id0@xxx                                                 ~71
Subject: Completion of Submission of Quotation to Company AAA Dear id1

I submitted a quotation to Company AAA yesterday.            ~72
I'll let you know when I receive a response from the client this weekend.

id1@xxx   ☐Noted   ▨Thanks   ☐No CC needed   ☐Free comment
id2@xxx   ▨Noted   ☐Thanks   ☐No CC needed   ▨Let me know as soon as
                                                a re-quotation is needed
id3@xxx   ☐Noted   ☐Thanks   ▨No CC needed   ☐Free comment   ~73
```

SUPPORTING MESSAGE SHARING

This application is a continuation application claiming priority to Ser. No. 14/838,487, filed Aug. 28, 2015, now U.S. Pat. No. 9,819,625, issued Nov. 14, 2017.

TECHNICAL FIELD

The present invention relates to an apparatus and a method for supporting message sharing, and in particular, the present invention relates to an apparatus and a method for supporting message sharing among a plurality of terminals.

BACKGROUND

In recent years, e-mail has served as main communication means for organizations, such as corporations. In this e-mail, a TO destination and a CC destination can be specified with ease, and thus, in organizations, such as corporations, many e-mails in which a plurality of destinations have been specified are transmitted. That is, many e-mails are transmitted from a transmitting terminal to a plurality of receiving terminals. On the other hand, a message is sometimes returned in response to an e-mail transmitted from a transmitting terminal to a plurality of receiving terminals. In many cases, a message is returned from a receiving terminal specified as a TO destination, and a message is returned from a receiving terminal specified as a CC destination too when necessary.

However, among the messages, there may be also a message containing a small amount of information. Here, messages containing a small amount of information are, for example, short replies, such as "Noted" and "Thanks", a request to delete a mail address specified as a CC destination, a request to add a mail address of another user as a CC destination, a notification of misdirection, and the like. In an existing transmitting terminal, such messages containing a small amount of information have also been individually checked. Hence, there has been a problem in that a load imposed on a transmitting terminal checking messages from a plurality of receiving terminals responsive to an e-mail transmitted from the transmitting terminal to the plurality of receiving terminals is high.

In a receiving terminal, to convey a message containing a small amount of information, such as the above message, a message is created in response to an e-mail transmitted from a transmitting terminal in each case. Hence, as the total number of e-mails containing a CC destination received by a user increases, a load imposed on the user creating a message with a receiving terminal increases.

BRIEF SUMMARY

The present invention provides a method, and associated computer program product and computer system, for processing an email.

A mail hub device receives, from a first mail client, the email.

The mail hub device transmits, to a Mail Thread Board (MTB) server, a request for a Mail Thread ID (MTID) and in response, the mail hub device receives the MTID from the MTB server.

The mail hub device adds the MTID to the email.

The mail hub device transmits, to the MTB server, a request for additional data for the email and in response, the mail hub device receives, from the MTB server, the additional data.

The mail hub device adds the additional data to the email to which the MTID was added, wherein the additional data includes a plurality of messages.

The mail hub device transmits, to a second mail client, the email to which the MTID and the additional data was added.

The mail hub device receives, from the second mail client, the MTID together with an indicated selection, by the second mail client, of a message selected from the plurality of messages.

The mail hub device transmit, to the MTB server, a request, which includes the MTID and the selection of the message, to generate an update of the additional data, the update being based on the selection of the message.

The mail hub device receives, from the MTB server, the MTID together with the updated additional data based on the selection of the message, the updated additional data having been generated by the MTB server and stored on the MTB server.

The mail hub device transmits, to the first mail client, the MTID together with the updated additional data based on the selection of the message.

BRIEF DESCRIPTION OF THE DRAWINGS

FIG. 6 is a diagram illustrating an example of a user interface (UI) provided when a mail client transmits mail, in accordance with embodiments of the present invention.

FIG. 7 is a diagram illustrating an example of a UI provided when a mail client receives the mail, in accordance with embodiments of the present invention.

FIG. 8 is a diagram illustrating an example of a UI provided when the mail client transmits a selection, in accordance with embodiments of the present invention.

FIG. 9 is a diagram illustrating an example of a UI provided when the mail client receives updated additional data, in accordance with embodiments of the present invention.

FIG. 10 is a diagram illustrating an example of a UI provided when the mail client receives the additional data, in accordance with embodiments of the present invention.

DETAILED DESCRIPTION

Figure 1:
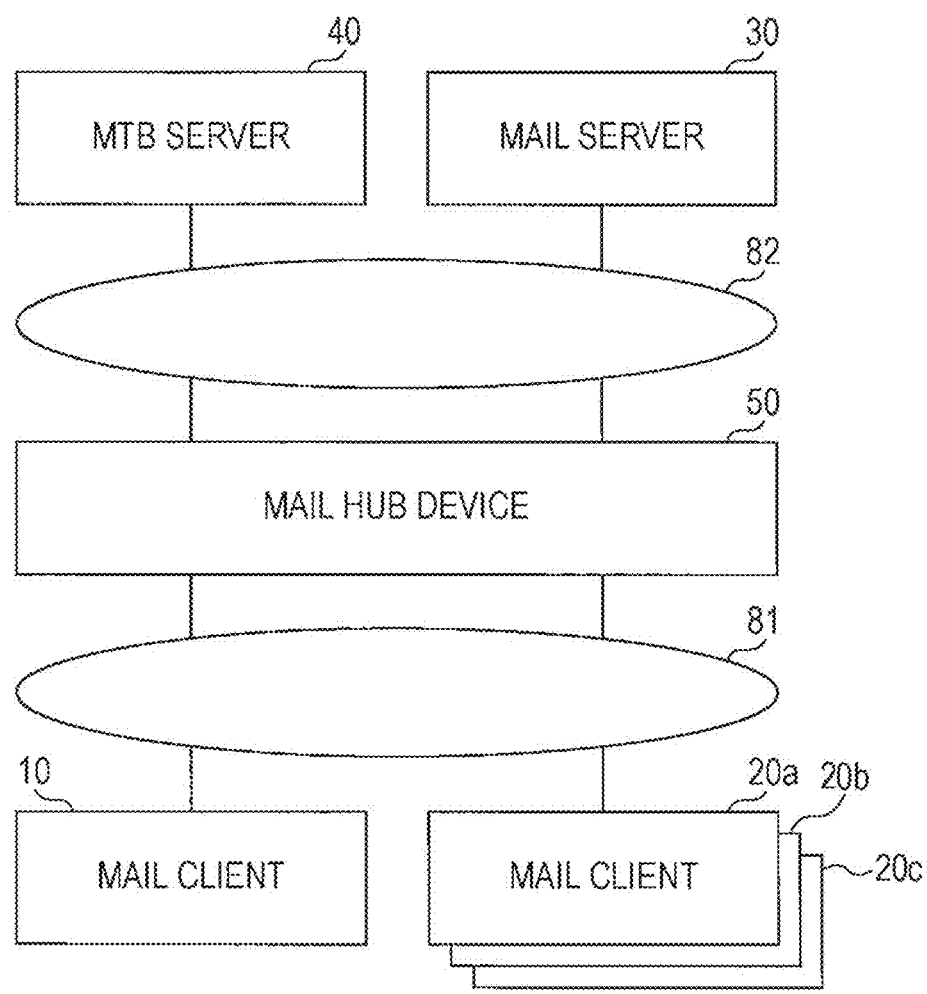
FIG. 1 is a diagram illustrating an example of an overall configuration of a computer system, in accordance with embodiments of the present invention.

Embodiments of the present invention will be described in detail below with reference to the accompanying drawings.

The present invention reduces a load imposed on a transmitting terminal checking messages from a plurality of receiving terminals responsive to an e-mail transmitted from the transmitting terminal to the plurality of receiving terminals.

The present invention reduces a load imposed on a receiving terminal creating a message responsive to an e-mail transmitted from a transmitting terminal to a plurality of receiving terminals.

The present invention provides an apparatus for supporting message sharing among a plurality of terminals, including a generation unit configured to be responsive to transmission of an e-mail from a transmitting terminal to a plurality of receiving terminals to generate a storage region associated with the e-mail; a retaining unit configured to be responsive to transmission of message information from one of the plurality of receiving terminals to retain the message information in the storage region, the message information indicating a message responsive to the e-mail; and a transmitting unit configured to transmit to the transmitting terminal and the plurality of receiving terminals information that provides an instruction to display the message information retained in the storage region in association with the e-mail.

Here, the transmitting unit may be responsive to a request from a specific one of the transmitting terminal and the plurality of receiving terminals to transmit to the specific one information that provides an instruction to display the message information retained in the storage region in association with the e-mail.

Furthermore, the transmitting unit may transmit to the plurality of receiving terminals information that provides an instruction to display a plurality of message options responsive to the e-mail in association with the e-mail. In this case, the retaining unit may be responsive to transmission of message information from the one of the receiving terminals to retain the message information in the storage region, the message information indicating a message responsive to the e-mail based on a selection state of the plurality of message options.

Furthermore, this apparatus may further include an acquisition unit configured to acquire identification information identifying the storage region; and an association unit configured to associate the storage region with the e-mail by adding the identification information to the e-mail. In this case, the retaining unit may be responsive to transmission of the message information and the identification information from the one of the receiving terminals to retain the message information in the storage region identified by the identification information, and the transmitting unit may transmit to the transmitting terminal and the plurality of receiving terminals information that provides an instruction to display the message information retained in the storage region identified by the identification information in association with the e-mail to which the identification information has been added.

Furthermore, the present invention also provides an apparatus for supporting message sharing among a plurality of terminals, including a generation unit configured to be responsive to transmission of an e-mail from a transmitting terminal to a plurality of receiving terminals to generate a storage region associated with the e-mail; a transmitting unit configured to transmit to the plurality of receiving terminals information that provides an instruction to display in association with the e-mail option information that represents a plurality of message options responsive to the e-mail and set respectively for the plurality of receiving terminals; and a retaining unit configured to be responsive to transmission of message information from one of the plurality of receiving terminals to retain the message information in the storage region, the message information indicating a message responsive to the e-mail based on a selection state of the plurality of message options set for the one of the receiving terminals and represented by the option information, wherein the transmitting unit transmits to the transmitting terminal and the plurality of receiving terminals information that provides an instruction to display the message information retained in the storage region in association with the e-mail.

Furthermore, the present invention also provides a method for supporting message sharing among a plurality of terminals including the steps of receiving an e-mail transmitted from a transmitting terminal to a plurality of receiving terminals; in response to reception of the e-mail, displaying on the plurality of receiving terminals in association with the e-mail option information that represents a plurality of message options responsive to the e-mail and set respectively for the plurality of receiving terminals; receiving from one of the plurality of receiving terminals message information indicating a message responsive to the e-mail based on a selection state of the plurality of message options set for the one of the receiving terminals and represented by the option information; and, in response to reception of the message information, displaying the message information in association with the e-mail on the transmitting terminal and the plurality of receiving terminals.

Furthermore, the present invention also provides a program product for causing a computer to function as an apparatus for supporting message sharing among a plurality of terminals, which causes the computer to function as a generation unit configured to be responsive to transmission of an e-mail from a transmitting terminal to a plurality of receiving terminals to generate a storage region associated with the e-mail; a retaining unit configured to be responsive to transmission of message information from one of the plurality of receiving terminals to retain the message information in the storage region, the message information indicating a message responsive to the e-mail; and a transmitting unit configured to transmit to the transmitting terminal and the plurality of receiving terminals information that provides an instruction to display the message information retained in the storage region in association with the e-mail.

The present invention enables a reduction in a load imposed on a transmitting terminal checking messages from a plurality of receiving terminals responsive to an e-mail transmitted from the transmitting terminal to the plurality of receiving terminals.

The present embodiment provides a mechanism in which a transmitting terminal and a receiving terminal for e-mail (hereinafter simply referred to as "mail") share a short message which is in response to transmitted mail by using additional data linked to a thread (hereinafter referred to as a "mail thread"), which is a grouping of a plurality of messages associated with the mail. Here, as short messages, there are replies, such as "Noted" and "Thanks", a request to delete a mail address specified as a CC destination, a request to add a mail address of another user as a CC destination, and the like.

FIG. 1 is a diagram illustrating an example of an overall configuration of a computer system for implementing such a mechanism, in accordance with embodiments of the present invention. As illustrated in the diagram, this computer system includes a mail client 10, mail clients 20a, 20b, and 20c, a mail server 30, an MTB (Mail Thread Board) server 40, and a mail hub device 50. Then, the mail client 10, the mail clients 20a, 20b, and 20c, and the mail hub device 50 are connected via a network 81. In addition, the mail server 30, the MTB server 40, and the mail hub device 50 are connected via a network 82. Although the diagram illustrates the mail clients 20a, 20b, and 20c, it is noted that these are each referred to as a mail client 20 when these do not have to be distinguished from one another (i.e., mail client 20 denotes any mail client of mail clients 20a, 20b, and 20c). Furthermore, although FIG. 1 illustrates one mail client 10 and three mail clients 20, two or more mail clients 10 may be provided, and four or more mail clients 20 may be provided.

The mail client 10 is a transmission-side client computer used when a mail sender transmits mail. A mailer is installed on the mail client 10. Then, when the sender composes mail by using the mailer and provides an instruction to transmit the mail, the mail client 10 transmits the mail to the mail hub device 50. The mail client 10 may be a computer (e.g., desktop PC (Personal Computer), a notebook PC, or the like).

The mail client 20 is a reception-side client computer used when a mail recipient receives mail. A mailer is installed on the mail client 20 too. Then, the mail client 20 receives mail transmitted by the mail client 10 from the mail hub device 50 by using a function of the mailer. The mail client 20 may be a computer (e.g., desktop PC (Personal Computer), a notebook PC, or the like).

Here, it is noted that the mail client 10 functioning as a mail transmission side is provided separately from the mail client 20 functioning as a mail reception side. However, a mail client functioning as both a mail transmission side and a mail reception side may be provided.

The mail server 30 is a server computer to manage transmission and reception of mail between the mail client 10 and the mail client 20. Technically, although, as the mail server 30, there are an SMTP server that transmits mail to a destination in another network, and a POP server that stores mail transmitted to a destination within its own network and waits for a reception request from the mail client 20, there is illustrated here the mail server 30 as a server serving as both these servers. The mail server 30 may be a computer (e.g., PC, a workstation, or the like).

The MTB server 40 is a server computer to manage additional data linked to a mail thread. The details of an operation will be described later. The MTB server 40 may be a computer (e.g., PC, a workstation, or the like).

The mail hub device 50 is a device to hook transmission and reception of mail between the mail client 10 and the mail server 30, and between the mail client 20 and the mail server 30, and to control additional data of each piece of mail. That is, the mail hub device 50 is a device to provide support so that additional data is shared among the mail client 10 and the mail client 20. The details of an operation will be described later. The mail hub device 50 may be a computer (e.g., PC, a workstation, or the like).

Here, it is noted that the MTB server 40 and the mail hub device 50 are separate devices. However, the MTB server 40 and the mail hub device 50 may be combined into a single device. In this case, such a device is an example of an apparatus for supporting message sharing among a plurality of terminals.

The network 81 is communication means used for information communication between the mail client 10 and the mail hub device 50, and between the mail client 20 and the mail hub device 50. Here, as the network 81, the Internet or the like may be used.

The network 82 is communication means used for information communication between the mail server 30 and the mail hub device 50, and between the MTB server 40 and the mail hub device 50. Here, as the network 82, the Internet, a LAN (Local Area Network), or the like may be used.

Figure 2:
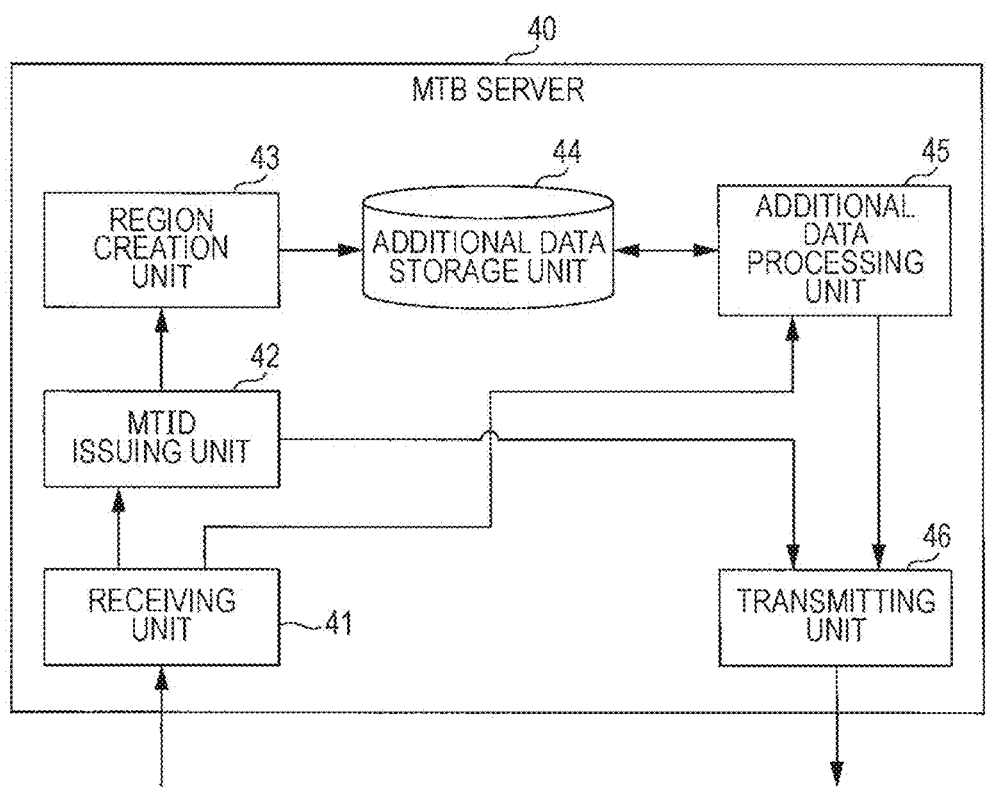
FIG. 2 is a block diagram illustrating an example of a functional configuration of an MTB server, in accordance with embodiments of the present invention.

FIG. 2 is a diagram illustrating an example of a functional configuration of the MTB server 40, in accordance with embodiments of the present embodiment. As illustrated in the diagram, the MTB server 40 includes a receiving unit 41, an MTID (Mail Thread ID) issuing unit 42, a region creation unit 43, an additional data storage unit 44, an additional data processing unit 45, and a transmitting unit 46.

When the mail client 10 is operated so as to transmit mail, the receiving unit 41 receives, from the mail hub device 50, request information for requesting issuance of an MTID, which is an ID identifying a mail thread, and creation of an additional data region, and then receives, from the mail hub device 50, request information for requesting acquisition of additional data associated with the MTID. In addition, when the mail client 20 is operated so as to select a message, the receiving unit 41 receives, from the mail hub device 50, request information for requesting updating of the additional data associated with the MTID based on a selection and acquisition of the updated additional data. Furthermore, when synchronization of additional data is requested from the mail client 10, the receiving unit 41 receives, from the mail hub device 50, request information for requesting acquisition of the additional data associated with the MTID.

When the receiving unit 41 receives request information for requesting issuance of an MTID and creation of an additional data region, the MTID issuing unit 42 issues the MTID. In the present embodiment, an MTID is used as an example of identification information identifying a storage region, and the MTID issuing unit 42 is provided as an example of an acquisition unit configured to acquire identification information.

When the MTID issuing unit 42 issues an MTID, the region creation unit 43 creates an additional data region in association with this MTID within the additional data storage unit 44. In the present embodiment, an additional data region is used as an example of a storage region associated with an e-mail, and the region creation unit 43 is provided as an example of a generation unit configured to generate a storage region.

The additional data storage unit 44 stores, in an additional data region created in association with an MTID by the region creation unit 43, additional data for mail of this MTID. The additional data is data in which message candidates supposed to be conveyed to a mail sender are set as options for each mail recipient, and also contains information on which of the message candidates has been selected. Here, as message candidates, fixed messages, such as "Noted", "Thanks", and "No CC needed", may be set. Among these, "Noted" and "Thanks" are reply messages to the mail. "No CC needed" is a request message to request deletion of one's own mail address from a CC destination field. Alternatively, a request message to request addition of a mail address of another person in the CC destination field may be set. Also, as a message candidate, a free description message in which the number of characters is limited may be set in addition to the above-described fixed messages. In the present embodiment, additional data is used as an example of message information indicating a message responsive to an e-mail, and also as an example of option information that represents a plurality of message options responsive to an e-mail and set respectively for a plurality of receiving terminals.

When the receiving unit 41 receives request information for requesting acquisition of additional data associated with an MTID, the additional data processing unit 45 reads out the additional data from an additional data region associated with this MTID within the additional data storage unit 44. In addition, when the receiving unit 41 receives request information for requesting updating of the additional data associated with the MTID based on a selection, the additional data processing unit 45 reads out the additional data from the additional data region associated with this MTID within the additional data storage unit 44, and updates this additional data based on the selection. In the present embodiment, the additional data processing unit 45 is provided as an example of a retaining unit configured to retain message information in a storage region.

When the MTID issuing unit 42 issues an MTID, the transmitting unit 46 transmits the MTID to the mail hub device 50. In addition, when the additional data processing unit 45 reads out additional data, the transmitting unit 46 transmits this additional data and the MTID to the mail hub device 50. Furthermore, when the additional data processing unit 45 updates the additional data, the transmitting unit 46 transmits the updated additional data and the MTID to the mail hub device 50.

Figure 3:
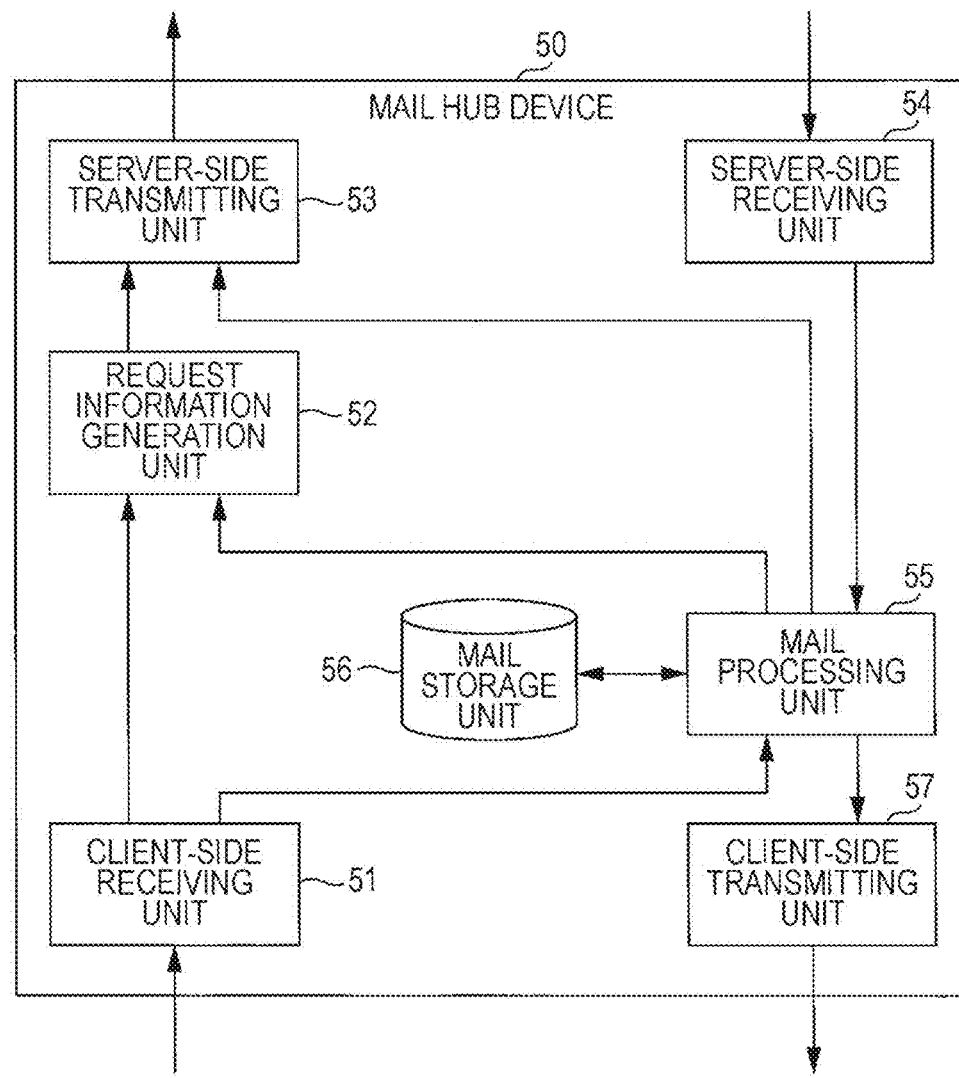
FIG. 3 is a block diagram illustrating an example of a functional configuration of a mail hub device, in accordance with embodiments of the present invention.

FIG. 3 is a diagram illustrating an example of a functional configuration of the mail hub device 50, in accordance with embodiments of the present embodiment. As illustrated in the diagram, the mail hub device 50 includes a client-side receiving unit 51, a request information generation unit 52, a server-side transmitting unit 53, a server-side receiving unit 54, a mail processing unit 55, a mail storage unit 56, and a client-side transmitting unit 57.

When the mail client 10 is operated so as to transmit mail, the client-side receiving unit 51 receives the mail from the mail client 10. In addition, when the mail client 20 is operated so as to select a message, the client-side receiving unit 51 receives a selection and an MTID from the mail client 20. Furthermore, when synchronization of additional data is requested from the mail client 10, the client-side receiving unit 51 receives a request for synchronization and the MTID from the mail client 10.

When the client-side receiving unit 51 receives mail from the mail client 10, the request information generation unit 52 generates request information for requesting issuance of an MTID and creation of an additional data region, and then generates request information for requesting acquisition of additional data associated with the MTID. In addition, when the client-side receiving unit 51 receives a selection and the MTID from the mail client 20, the request information generation unit 52 generates request information for requesting updating of the additional data associated with the MTID based on the selection. Furthermore, when the client-side receiving unit 51 receives a request for synchronization and the MTID from the mail client 10, the request information generation unit 52 generates request information for requesting acquisition of the additional data associated with the MTID.

When the request information generation unit 52 generates any of request information for requesting issuance of an MTID and creation of an additional data region, request information for requesting acquisition of additional data associated with the MTID, and request information for requesting updating of the additional data associated with the MTID based on a selection, the server-side transmitting unit 53 transmits this request information to the MTB server 40. In addition, when the mail processing unit 55 adds the MTID to mail and thereby generates mail with the MTID, the server-side transmitting unit 53 transmits this mail with the MTID to the mail server 30.

When the mail client 10 is operated so as to transmit mail, the server-side receiving unit 54 receives an MTID from the MTB server 40, then receives mail with the MTID from the mail server 30, and then receives additional data and the MTID from the MTB server 40. In addition, when the mail client 20 is operated so as to select a message, the server-side receiving unit 54 receives updated additional data and the MTID. Furthermore, when synchronization of additional data is requested from the mail client 10, the server-side receiving unit 54 receives the additional data and the MTID.

When the mail client 10 is operated so as to transmit mail, the mail processing unit 55 stores, in the mail storage unit 56, the mail received by the client-side receiving unit 51 from the mail client 10. Then, the mail processing unit 55 adds an MTID received by the server-side receiving unit 54 from the MTB server 40 to the mail stored in the mail storage unit 56. Subsequently, the mail processing unit 55 stores mail with the MTID received by the server-side receiving unit 54 from the mail server 30 in the mail storage unit 56, and extracts the MTID from the mail with the MTID. Then, when the server-side receiving unit 54 receives additional data associated with this MTID from the MTB server 40, the mail processing unit 55 adds this additional data to the mail with the MTID stored in the mail storage unit 56. In addition, when the mail client 20 is operated so as to select a message, the mail processing unit 55 passes updated additional data received by the server-side receiving unit 54 from the MTB server 40 and the MTID directly to the client-side transmitting unit 57. Furthermore, when synchronization of additional data is requested from the mail client 10, the mail processing unit 55 passes the additional data received by the server-side receiving unit 54 from the MTB server 40 and the MTID directly to the client-side transmitting unit 57. In the present embodiment, the mail processing unit 55 is provided as an example of an association unit configured to associate a storage region with an e-mail by adding identification information to the e-mail.

When the mail processing unit 55 adds additional data to mail with an MTID and thereby generates mail with the MTID and the additional data, the client-side transmitting unit 57 transmits this mail with the MTID and the additional data to the mail client 20. In addition, when updated additional data and the MTID are passed from the mail processing unit 55, the client-side transmitting unit 57 transmits these to the mail client 20. Furthermore, when the additional data and the MTID are passed from the mail processing unit 55, the client-side transmitting unit 57 transmits these to the mail client 10. In the present embodiment, the client-side transmitting unit 57 is provided as an example of a transmitting unit configured to transmit information that provides an instruction to display message information in association with an e-mail, and also as an example of a transmitting unit configured to transmit information that provides an instruction to display option information in association with an e-mail.

Figure 4:
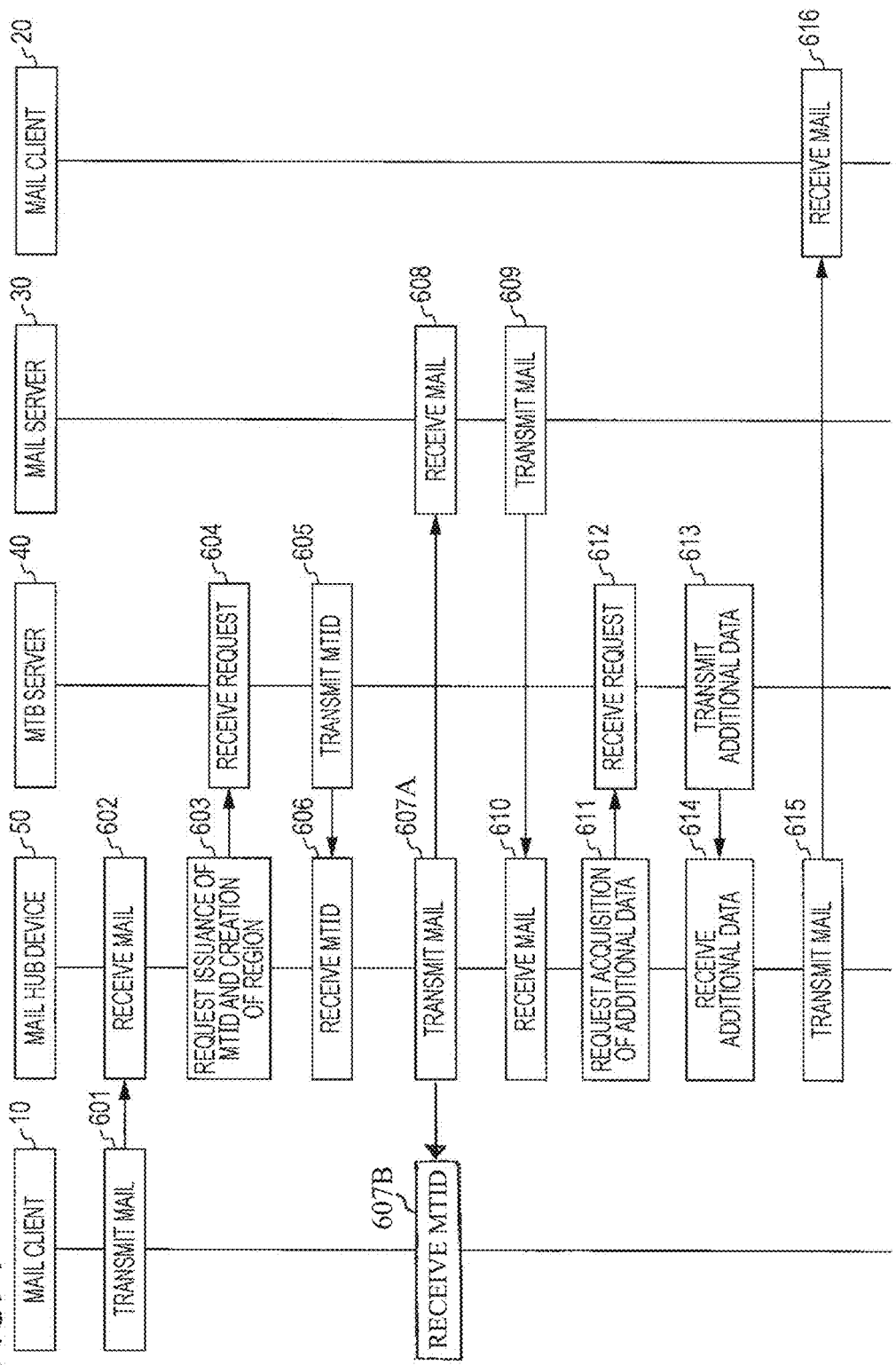
FIG. 4 is a sequence diagram illustrating an example of an operation performed when mail is transmitted in the computer system, in t accordance with embodiments of the present invention.

FIG. 4 is a sequence diagram illustrating an example of an operation performed when mail is transmitted in the computer system, in accordance with embodiments of the present embodiment. This operation starts by a mail sender operating the mail client 10 so as to provide an instruction to transmit mail.

When the operation starts, first, the mail client 10 transmits mail to the mail hub device 50 (step 601).

Then, the mail hub device 50 receives the mail from the mail client 10 (step 602). Specifically, the client-side receiving unit 51 receives the mail transmitted by the mail client 10. Thus, the mail hub device 50 requests the MTB server 40 to issue an MTID and create an additional data region to store additional data for this mail (step 603). Specifically, the mail processing unit 55 stores this mail in the mail storage unit 56. Then, the request information generation unit 52 generates request information for requesting issuance of the MTID and creation of the additional data region. Subsequently, the server-side transmitting unit 53 transmits this request information to the MTB server 40.

Then, the MTB server 40 receives the request for issuance of the MTID and creation of the additional data region from the mail hub device 50 (step 604). Specifically, the receiving unit 41 receives the request information transmitted by the server-side transmitting unit 53. Thus, the MTB server 40 issues the MTID, and transmits this to the mail hub device 50 (step 605). Specifically, the MTID issuing unit 42 issues the MTID. Then, the transmitting unit 46 transmits this MTID to the mail hub device 50. At this time, although the following is not illustrated in FIG. 4, the region creation unit 43 creates the additional data region in association with this MTID within the additional data storage unit 44. Then, initial values of the additional data are stored in the additional data region. Here, the initial values of the additional data are additional data in a state in which none of message candidates set for each mail recipient have been selected.

Then, the mail hub device 50 receives the MTID from the MTB server 40 (step 606). Specifically, the server-side receiving unit 54 receives the MTID transmitted by the transmitting unit 46. Thus, the mail hub device 50 transmits mail with the MTID, to which this MTID has been added by the mail hub device 50, to the mail server 30 (step 607A). Specifically, the mail processing unit 55 reads out the mail stored in the mail storage unit 56, deletes it from the mail storage unit 56, and adds the received MTID to this mail. Then, the server-side transmitting unit 53 transmits the mail with the MTID, to which the MTID has been added, to the mail server 30. Also in step 607A, the mail hub device 50 transmits the MTID to the mail client 10. The MTID is received by the mail client 10 (step 607B). The MTID is retained in the mail client 10.

Then, the mail server 30 receives the mail with the MTID from the mail hub device 50 (step 608). Thus, the mail server 30 performs processing to be performed by a typical mail server on this mail, and then transmits the processed mail with the MTID to the mail hub device 50 (step 609).

Then, the mail hub device 50 receives the processed mail with the MTID from the mail server 30 (step 610). Specifically, the server-side receiving unit 54 receives the mail with the MTID transmitted by the mail server 30. Thus, the mail hub device 50 requests the MTB server 40 to acquire the additional data for this mail (step 611). Specifically, the mail processing unit 55 stores the received mail with the MTID in the mail storage unit 56, and extracts the MTID from the mail with the MTID. Then, the request information generation unit 52 generates request information which contains the MTID and in which acquisition of the additional data is requested. Subsequently, the server-side transmitting unit 53 transmits this request information to the MTB server 40.

Then, the MTB server 40 receives the request for acquisition of the additional data from the mail hub device 50 (step 612). Specifically, the receiving unit 41 receives the request information transmitted by the server-side transmitting unit 53. Thus, the MTB server 40 acquires this additional data, and transmits it to the mail hub device 50 (step 613). Specifically, the additional data processing unit 45 retrieves the additional data region associated with the MTID contained in the received request information from the additional data storage unit 44, and reads out the additional data stored in the region. At this time, it is noted that, since the initial values of the additional data remain stored in the additional data region, the additional data in a state in which none of the message candidates set for each mail recipient have been selected is read out. Then, the transmitting unit 46 transmits this additional data to the mail hub device 50.

Then, the mail hub device 50 receives the additional data from the MTB server 40 (step 614). Specifically, the server-side receiving unit 54 receives the additional data transmitted by the transmitting unit 46. Thus, the mail hub device 50 transmits mail with the MTID and the additional data, to which the MTID and the additional data have been added by the mail hub device 50, to the mail client 20 (step 615). Specifically, the mail processing unit 55 reads out the mail with the MTID stored in the mail storage unit 56, deletes it from the mail storage unit 56, and adds the received additional data to this mail with the MTID. Then, the client-side transmitting unit 57 transmits the mail with the MTID and the additional data, to which the MTID and the additional data have been added, to the mail client 20.

Finally, the mail client 20 receives the mail with the MTID and the additional data from the mail hub device 50 (step 616). As a result, the additional data, in which the message candidates supposed to be conveyed to the mail sender are set as options for each mail recipient, is displayed in association with the mail on the mail client 20.

Figure 5:
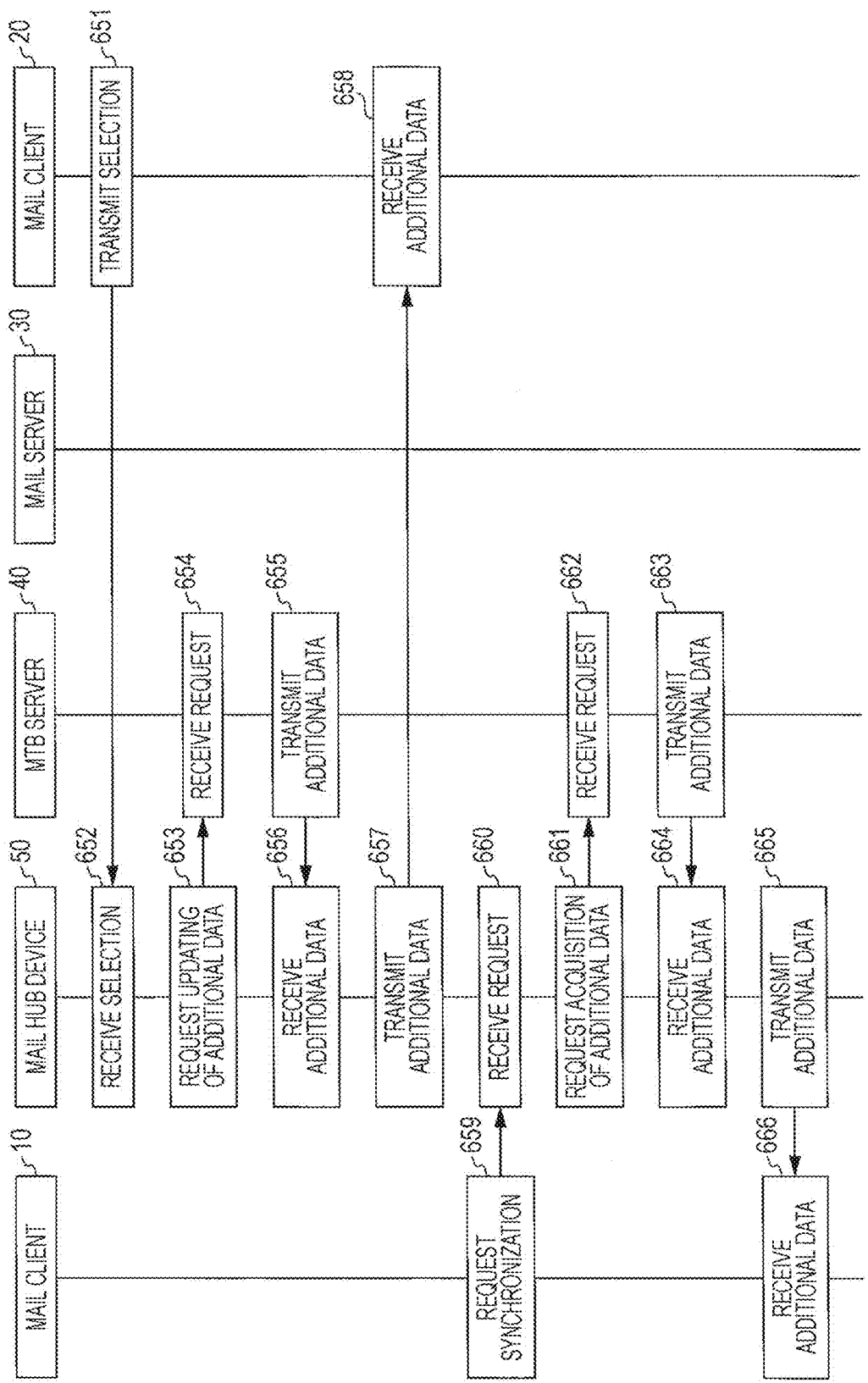
FIG. 5 is a sequence diagram illustrating an example of an operation performed when a message is selected in the computer system, in accordance with embodiments of the present invention.

FIG. 5 is a sequence diagram illustrating an example of an operation performed when a message is selected in the computer system, in accordance with embodiments of the present embodiment. This operation starts by a mail recipient operating the mail client 20 so as to select any message from among the message candidates set for the mail client 20 which are contained in the additional data displayed on the mail client 20 in step 616 in FIG. 4.

When the operation starts, first, the mail client 20 transmits a selection obtained as a result of the operation thereof together with the MTID to the mail hub device 50 (step 651).

Then, the mail hub device 50 receives the selection together with the MTID from the mail client 20 (step 652). Specifically, the client-side receiving unit 51 receives the selection and the MTID which have been transmitted by the mail client 20. Thus, the mail hub device 50 requests the MTB server 40 to update the additional data based on the selection (step 653). Specifically, the request information generation unit 52 generates request information which contains the MTID and the selection, and in which updating of the additional data is requested. Then, the server-side transmitting unit 53 transmits this request information to the MTB server 40.

Then, the MTB server 40 receives the request for updating of the additional data based on the selection from the mail hub device 50 (step 654). Specifically, the receiving unit 41 receives the request information transmitted by the server-side transmitting unit 53. Thus, the MTB server 40 updates the additional data based on the selection, and transmits the updated additional data to the mail hub device 50 (step 655). Specifically, the additional data processing unit 45 retrieves the additional data region associated with the MTID contained in the received request information from the additional data storage unit 44, and reads out the additional data stored in the region. Then, the additional data processing unit 45 updates the additional data based on the selection contained in the received request information, and writes the updated additional data back in the additional data region.

Subsequently, the transmitting unit 46 transmits this updated additional data and the MTID to the mail hub device 50.

Then, the mail hub device 50 receives the updated additional data together with the MTID from the MTB server 40 (step 656). Specifically, the server-side receiving unit 54 receives the updated additional data and the MTID which have been transmitted by the transmitting unit 46. Thus, the mail hub device 50 transmits the updated additional data together with the MTID to the mail client 20 (step 657). Specifically, the mail processing unit 55 receives the updated additional data and the MTID which have been received. Then, the client-side transmitting unit 57 transmits the updated additional data and the MTID to the mail client 20.

Then, the mail client 20 receives the updated additional data together with the MTID from the mail hub device 50 (step 658). As a result, a message selected by the mail client 20 from among the message candidates is indicated in the additional data displayed on the mail client 20 in step 616 in FIG. 4.

On the other hand, the mail client 10 specifies the MTID, and makes a request to the mail hub device 50 for synchronization with the additional data on the MTB server 40 (step 659).

Then, the mail hub device 50 receives the request for synchronization together with the MTID from the mail client 10 (step 660). Specifically, the client-side receiving unit 51 receives the request for synchronization together with the MTID from the mail client 10. Thus, the mail hub device 50 requests the MTB server 40 to acquire the additional data (step 661). Specifically, the request information generation unit 52 generates request information which contains the MTID and in which acquisition of the additional data is requested. Then, the server-side transmitting unit 53 transmits this request information to the MTB server 40.

Then, the MTB server 40 receives the request for acquisition of the additional data from the mail hub device 50 (step 662). Specifically, the receiving unit 41 receives the request information transmitted by the server-side transmitting unit 53. Thus, the MTB server 40 acquires the additional data, and transmits the additional data to the mail hub device 50 (step 663). Specifically, the additional data processing unit 45 retrieves the additional data region associated with the MTID contained in the received request information from the additional data storage unit 44, and reads out the additional data stored in the region. Then, the transmitting unit 46 transmits this additional data and the MTID to the mail hub device 50.

Then, the mail hub device 50 receives the additional data together with the MTID from the MTB server 40 (step 664). Specifically, the server-side receiving unit 54 receives the additional data and the MTID which have been transmitted by the transmitting unit 46. Thus, the mail hub device 50 transmits the additional data together with the MTID to the mail client 10 (step 665). Specifically, the mail processing unit 55 receives the additional data and the MTID which have been received. Then, the client-side transmitting unit 57 transmits the additional data and the MTID to the mail client 10.

Finally, the mail client 10 receives the additional data together with the MTID from the mail hub device 50 (step 666). As a result, the additional data in which the message selected by the mail recipient from among the message candidates is indicated is displayed in association with the mail transmitted in step 601 in FIG. 4 on the mail client 10.

In the example of this operation, the mail client 10 requests synchronization with the additional data on the MTB server 40 in step 659 and thereby receives the up-to-date additional data in step 666; however, it is noted that the operation is not limited to this. For example, when the mail hub device 50 transmits the updated additional data to the mail client 20 in step 657, the mail hub device 50 may transmit it to the mail client 10 too, and thus the mail client 10 may receive the up-to-date additional data.

In addition, in the example of this operation, the up-to-date additional data is transmitted to only the mail clients 10 and 20; however, the operation is not limited to this. For example, suppose that the mail client 20 in the example of this operation is the mail client 20*a*, and that the mail clients 20*b* and 20*c* are additionally provided as reception-side mail clients 20, the up-to-date additional data may be transmitted to the mail clients 20*b* and 20*c* too. Specifically, the mail clients 20*b* and 20*c* may request synchronization with the additional data on the MTB server 40, and thus the up-to-date additional data may be transmitted to the mail clients 20*b* and 20*c*. Also, the mail hub device 50 may transmit the updated additional data to the mail clients 20*b* and 20*c* too in step 657, and may thus transmit the up-to-date additional data to the mail clients 20*b* and 20*c*.

FIG. 6 is a diagram illustrating an example of a UI provided when the mail client 10 transmits the mail in step 601 in FIG. 4, in accordance with embodiments of the present invention. As illustrated in the diagram, this UI includes a header display region 71 and a body text display region 72. Then, in the header display region 71, there is indicated that the sender of this mail is a user having a mail address "id0@xxx", a recipient serving as a TO destination of this mail is a user having a mail address "id1@xxx", and recipients serving as CC destinations of this mail are a user having a mail address "id2@xxx" and a user having a mail address "id3@xxx". It is noted that, hereinafter, the user having the mail address "id0@xxx", the user having the mail address "id1@xxx", the user having the mail address "id2@xxx", and the user having the mail address "id3@xxx" are respectively called a user 0, a user 1, a user 2, and a user 3. In addition, the user 0 uses the mail client 10, and the user 1, the user 2, and the user 3 respectively use the mail client 20*a*, the mail client 20*b*, and the mail client 20*c*.

FIG. 7 is a diagram illustrating an example of a UI provided when the mail client 20*a* receives the mail in step 616 in FIG. 4, in accordance with embodiments of the present invention. As illustrated in the diagram, this UI further includes a message selection region 73. Then, in the message selection region 73, there are indicated, for the mail addresses of all the recipients, message candidates supposed to be conveyed to the mail sender and check boxes for representing whether or not the message candidates have been selected. However, this diagram illustrates the UI of the mail client 20*a* used by the user 1, only check boxes for the mail address "id1@xxx" can therefore be marked, and check boxes for the other mail addresses are grayed out and cannot be marked. In addition, the diagram also illustrates an MTID unit 70, which is indicated by dashed lines and is therefore not displayed as a UI, that stores an MTID added to the mail received by the mail client 20*a*.

FIG. 8 is a diagram illustrating an example of a UI provided when the mail client 20*a* transmits the selection in step 651 in FIG. 5, in accordance with embodiments of the present invention. Specifically, there is illustrated an example of a UI provided when the user 1 transmits a reply message "Thanks" in response to the received mail. As illustrated in the diagram, in the message selection region 73, for the mail address "id1@xxx", a check box corresponding to "Thanks" is marked.

FIG. 9 is a diagram illustrating an example of a UI provided when the mail client 20a receives the updated additional data in step 658 in FIG. 5, in accordance with embodiments of the present invention. As illustrated in the diagram, in the message selection region 73, for the mail address "id1@xxx", the state of FIG. 8 in which the check box corresponding to "Thanks" is marked remains unchanged. On the other hand, for the mail address "id2@xxx", a check box corresponding to "Noted" is marked. In addition, "Free comment" is rewritten as "Let me know as soon as a re-quotation is needed", and a check box corresponding thereto is also marked. This means that, in the MTB server 40, the additional data has been updated based on a selection provided by the mail client 20b before acquisition of the additional data updated based on the selection provided by the mail client 20a. However, the check boxes for the mail address "id2@xxx" and the mail address "id3@xxx" are grayed out and cannot be marked.

FIG. 10 is a diagram illustrating an example of a UI provided when the mail client 10 receives the additional data in step 666 in FIG. 5, in accordance with embodiments of the present invention. Specifically, there is illustrated an example of a UI provided when the user 1 transmits the reply message "Thanks" in response to the received mail, when the user 2 transmits the reply messages "Noted" and "Let me know as soon as a re-quotation is needed" in response to the received mail, and when the user 3 transmits a request message "No CC needed" in response to the received mail. As illustrated in the diagram, in the message selection region 73, for the mail address "id1@xxx", the check box corresponding to "Thanks" is marked. In addition, for the mail address "id2@xxx", the check box corresponding to "Noted" is marked, "Free comment" is rewritten as "Let me know as soon as a re-quotation is needed", and the check box corresponding thereto is also marked. Furthermore, for the mail address "id3@xxx", a check box corresponding to "No CC needed" is marked. However, this diagram illustrates the UI of the mail client 10 used by the user 0, and the check boxes for all of the mail addresses are therefore grayed out and cannot be marked.

In the present embodiment, the MTB server 40 and the mail hub device 50 are devices independent from the mail clients 10 and 20, and the mail server 30; however, they do not have to be independent devices. For example, a function of the mail hub device 50 may be implemented in the mail clients 10 and 20, or may be implemented in the mail server 30. In addition, functions of the MTB server 40 and the mail hub device 50 may be implemented in the mail server 30. In particular, in this case, devices included in the computer system in FIG. 1 are only the mail client 10, the mail clients 20a, 20b, and 20c, and the mail server 30.

In the present embodiment, an additional data region corresponding to a mail thread of mail is created in response to transmission of the mail, and a transmitting terminal and receiving terminals share up-to-date additional data for the mail thread. This enables a mail sender and mail recipients to check messages, in list form, from the mail recipients specified as a TO destination and a CC destination. In addition, the mail sender checks this message list, and thereby can determine a next action, and the mail recipients also check the same messages, and thereby can transmit a reply in consideration of the messages.

Additionally, in the present embodiment, a message to the mail sender is transmitted by performing an operation of, for example, marking a check box on additional data attached to received mail. This enables the mail recipients to transmit a message to the mail sender with ease.

Figure 11:
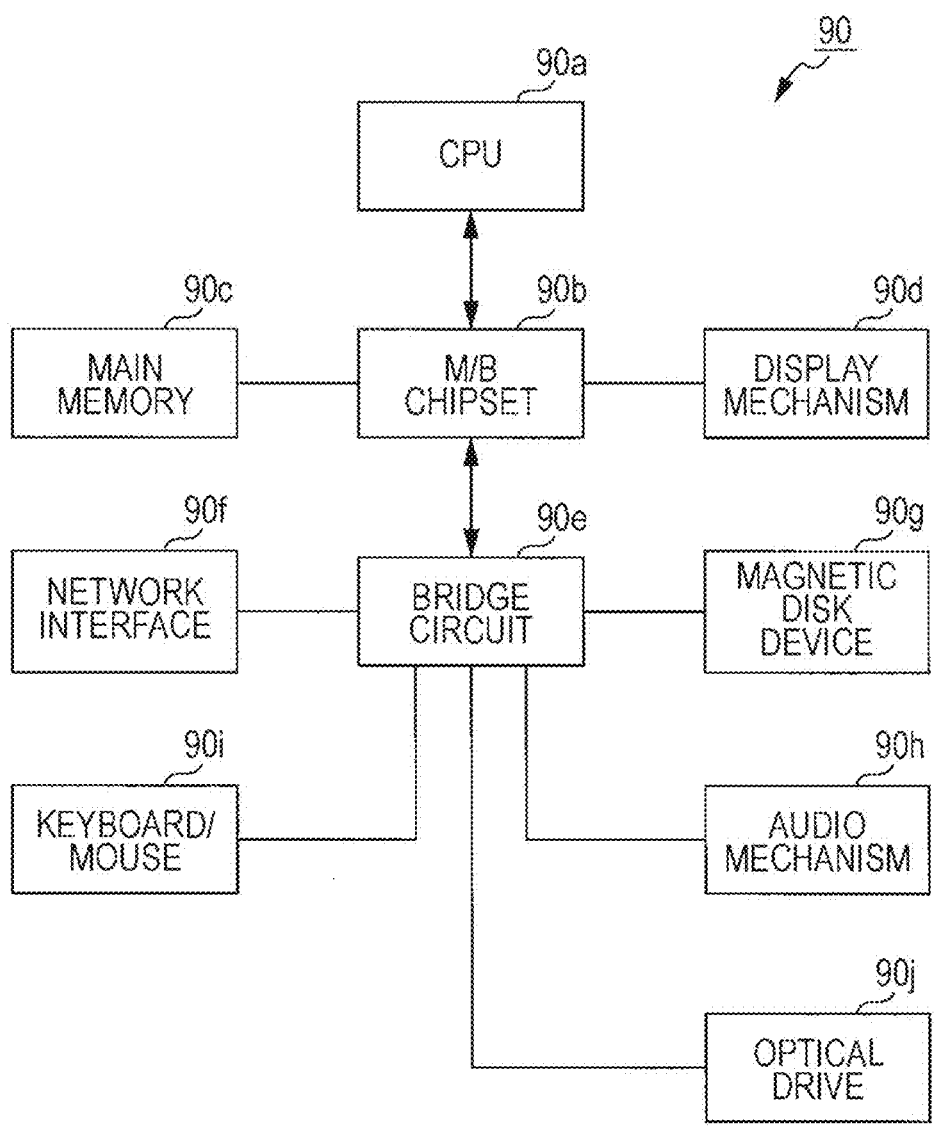
FIG. 11 is a diagram illustrating an example of a hardware configuration of a computer to which the embodiment of the present invention is applicable, in accordance with embodiments of the present invention.

FIG. 11 is a diagram illustrating an example of a hardware configuration of a computer 90 to which embodiment of the present invention is applicable. As illustrated in the diagram, the computer 90 includes a CPU (Central Processing Unit) 90a serving as computing means, a main memory 90c connected to the CPU 90a via an M/B (motherboard) chipset 90b, and a display mechanism 90d also connected to the CPU 90a via the M/B chipset 90b. In addition, a network interface 90f, a magnetic disk device (HDD) 90g, an audio mechanism 90h, a keyboard/mouse 90i, and an optical drive 90j are connected to the M/B chipset 90b via a bridge circuit 90e.

In FIG. 11, it is noted that individual components are connected via buses. For example, the CPU 90a and the M/B chipset 90b as well as the M/B chipset 90b and the main memory 90c are connected via a CPU bus. Then, the M/B chipset 90b and the display mechanism 90d may be connected via an AGP (Accelerated Graphics Port) bus; however, in the case where the display mechanism 90d includes a PCI Express-compatible video card, the M/B chipset 90b and this video card are connected via a PCI Express (PCIe) bus. In addition, in the case of connection to the bridge circuit 90e, for example, PCI Express can be used for the network interface 90f. Then, for example, serial ATA (AT Attachment), parallel transfer ATA, or PCI (Peripheral Components Interconnect) can be used for the magnetic disk device 90g. Furthermore, USB (Universal Serial Bus) can be used for the keyboard/mouse 90i and the optical drive 90j.

Here, the present invention may be implemented entirely in hardware or entirely in software. In addition, the present invention can be implemented in both hardware and software. Furthermore, the present invention can be implemented as a computer, a data processing system, or a computer program. This computer program can be stored in a computer-readable medium and provided. Here, as the medium, an electronic, magnetic, optical, electromagnetic, infrared, or semiconductor system (apparatus or device), or a propagation medium is conceivable. In addition, examples of the computer-readable medium include a semiconductor or solid state storage device, a magnetic tape, a removable computer diskette, a random access memory (RAM), a read only memory (ROM), a rigid magnetic disk, and an optical disk. Current examples of the optical disk include a compact disk-read only memory (CD-ROM), a compact disk-read/write (CD-R/W), and a DVD.

A computer program product of the present invention comprises a computer readable hardware storage medium/device having a computer readable program code stored therein, said program code containing instructions which, upon being executed by a processor of a computer system, implement the methods of the present invention.

A computer system of the present invention comprises a processor, a memory coupled to the processor, and a computer readable storage device coupled to the processor, said storage device containing program code which, upon being executed by the processor via the memory, implements the methods of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention has been described above by using the embodiment; however, the technical scope of the present invention is not limited to the above embodiment. It is obvious to those skilled in the art that various modifications can be made or alternative forms can be employed without departing from the spirit and scope of the present invention.

What is claimed is:

1. A method for processing an email, said method comprising:

transmitting, by a mail hub device to a Mail Thread Board (MTB) server, a request for a Mail Thread ID (MTID) and in response, said mail hub device receiving the MTID from the MTB server, said email having been received by a mail hub device from a first mail client, said mail hub device being a first computer, said first mail client being a second computer, said MTB server being a third computer;

adding, by the mail hub device, the MTID to the email;
transmitting, by the mail hub device to the MTB server, a request for additional data for the email and in response, said mail hub device receiving, from the MTB server, the additional data;
adding, by the mail hub device, the additional data to the email to which the MTID was added, wherein the additional data includes a plurality of messages;
transmitting, by the mail hub device to a second mail client, the email to which the MTID and the additional data was added, wherein the second mail client is a fourth computer;
receiving, by the mail hub device from the second mail client, the MTID together with an indicated selection, by the second mail client, of a message selected from the plurality of messages;
transmitting, by the mail hub device to the MTB server, a request, which includes the MTID and the selection of the message, to generate an update of the additional data, said update based on the selection of the message;
receiving, by the mail hub device from the MTB server, the MTID together with the updated additional data based on the selection of the message, said updated additional data having been generated by the MTB server and stored on the MTB server; and
transmitting, by the mail hub device to the first mail client, the MTID together with the updated additional data based on the selection of the message.

2. The method of claim 1, said method further comprising:
receiving, by the mail hub device from the first mail client prior to said transmitting the updated additional data to the first mail client, the MTID together with a request for synchronization with the updated additional data stored on the MTB server, wherein said transmitting the MTID together with the updated additional data to the first mail client is in response to said request for synchronization.

3. The method of claim 1, said method further comprising:
transmitting, by the mail hub device to the second mail client, the MTID together with the updated additional data.

4. The method of claim 1, said method further comprising:
prior to said transmitting the request for additional data, said mail hub device transmitting the MTID email to a mail server, wherein the email server is a fifth computer, and wherein the fifth computer is a different computer than the first computer, the second computer, the third computer and the fourth computer; and
receiving, by the mail hub device from the mail server, the MTID email after the mail server processed the email that is within the MTID email.

5. The method of claim 1, wherein the request for additional data transmitted by the mail hub device to the MTB server includes a request for the MTB server to store the additional data in a storage unit within the MTB server.

6. The method of claim 1, wherein each message of the plurality of messages is a response to the email.

7. The method of claim 1, wherein the mail hub device is connected to both the first email client and the second email client by a first network, wherein the mail hub device is connected to MTB server by a second network, and wherein the first network and the second network are different networks.

8. The method of claim 1, wherein the first computer, the second computer, the third computer, and the fourth computer are different computers.

9. A computer program product, comprising a computer readable hardware storage device having a computer readable program code stored therein, said program code containing instructions which, upon being executed by a processor of a mail hub device, implement a method for processing an email, said method comprising:
transmitting, by the mail hub device to a Mail Thread Board (MTB) server, a request for a Mail Thread ID (MTID) and in response, said mail hub device receiving the MTID from the MTB server, said email having been received by a mail hub device from a first mail client, said mail hub device being a first computer, said first mail client being a second computer, said MTB server being a third computer;
adding, by the mail hub device, the MTID to the email;
transmitting, by the mail hub device to the MTB server, a request for additional data for the email and in response, said mail hub device receiving, from the MTB server, the additional data;
adding, by the mail hub device, the additional data to the email to which the MTID was added, wherein the additional data includes a plurality of messages;
transmitting, by the mail hub device to a second mail client, the email to which the MTID and the additional data was added, wherein the second mail client is a fourth computer;
receiving, by the mail hub device from the second mail client, the MTID together with an indicated selection, by the second mail client, of a message selected from the plurality of messages;
transmitting, by the mail hub device to the MTB server, a request, which includes the MTID and the selection of the message, to generate an update of the additional data, said update based on the selection of the message;
receiving, by the mail hub device from the MTB server, the MTID together with the updated additional data based on the selection of the message, said updated additional data having been generated by the MTB server and stored on the MTB server; and
transmitting, by the mail hub device to the first mail client, the MTID together with the updated additional data based on the selection of the message.

10. The computer program product of claim 9, said method further comprising:
receiving, by the mail hub device from the first mail client prior to said transmitting the updated additional data to the first mail client, the MTID together with a request for synchronization with the updated additional data stored on the MTB server, wherein said transmitting the MTID together with the updated additional data to the first mail client is in response to said request for synchronization.

11. The computer program product of claim 9, said method further comprising:
transmitting, by the mail hub device to the second mail client, the MTID together with the updated additional data.

12. The computer program product of claim 9, said method further comprising:
prior to said transmitting the request for additional data, said mail hub device transmitting the MTID email to a mail server, wherein the email server is a fifth computer, and wherein the fifth computer is a different computer than the first computer, the second computer, the third computer and the fourth computer; and receiving, by the mail hub device from the mail server, the MTID email after the mail server processed the email that is within the MTID email.

13. The computer program product of claim 9, wherein the request for additional data transmitted by the mail hub device to the MTB server includes a request for the MTB server to store the additional data in a storage unit within the MTB server.

14. The computer program product of claim 9, wherein each message of the plurality of messages is a response to the email.

15. A computer system, comprising a mail hub device, said mail hub device comprising a processor, a memory coupled to the processor, and a computer readable storage device coupled to the processor, said storage device containing program code which, upon being executed by the processor via the memory, implement a method for processing an email, said method comprising:

transmitting, by the mail hub device to a Mail Thread Board (MTB) server, a request for a Mail Thread ID (MTID) and in response, said mail hub device receiving the MTID from the MTB server, said email having been received by a mail hub device from a first mail client, said mail hub device being a first computer, said first mail client being a second computer, said MTB server being a third computer;

adding, by the mail hub device, the MTID to the email;

transmitting, by the mail hub device to the MTB server, a request for additional data for the email and in response, said mail hub device receiving, from the MTB server, the additional data;

adding, by the mail hub device, the additional data to the email to which the MTID was added, wherein the additional data includes a plurality of messages;

transmitting, by the mail hub device to a second mail client, the email to which the MTID and the additional data was added, wherein the second mail client is a fourth computer;

receiving, by the mail hub device from the second mail client, the MTID together with an indicated selection, by the second mail client, of a message selected from the plurality of messages;

transmitting, by the mail hub device to the MTB server, a request, which includes the MTID and the selection of the message, to generate an update of the additional data, said update based on the selection of the message;

receiving, by the mail hub device from the MTB server, the MTID together with the updated additional data based on the selection of the message, said updated additional data having been generated by the MTB server and stored on the MTB server; and transmitting, by the mail hub device to the first mail client, the MTID together with the updated additional data based on the selection of the message.

16. The computer system of claim 15, said method further comprising:

receiving, by the mail hub device from the first mail client prior to said transmitting the updated additional data to the first mail client, the MTID together with a request for synchronization with the updated additional data stored on the MTB server, wherein said transmitting the MTID together with the updated additional data to the first mail client is in response to said request for synchronization.

17. The computer system of claim 15, said method further comprising:

transmitting, by the mail hub device to the second mail client, the MTID together with the updated additional data.

18. The computer system of claim 15, said method further comprising:

prior to said transmitting the request for additional data, said mail hub device transmitting the MTID email to a mail server, wherein the email server is a fifth computer, and wherein the first computer, the second computer, the third computer, the fourth computer, and the fifth computer are different computers; and receiving, by the mail hub device from the mail server, the MTID email after the mail server processed the email that is within the MTID email.

19. The computer system of claim 15, wherein the request for additional data transmitted by the mail hub device to the MTB server includes a request for the MTB server to store the additional data in a storage unit within the MTB server.

20. The computer system of claim 15, wherein each message of the plurality of messages is a response to the email.

* * * * *